Patented Nov. 29, 1949

2,489,531

UNITED STATES PATENT OFFICE 2,489,531

ALKYL-NAPHTHYL ETHERS AS INSECTICIDES

Theodore W. Kerr, Jr., Seymour, and Walter D. Harris, Naugatuck, Conn., assignors to United States Rubber Company, New York, N. Y., a corporation of New Jersey No Drawing. Application October 8, 1945, Serial No. 621,178

6 Claims. (Cl. 167—32)

This invention relates to improvements in insecticides. The term "insecticide" is considered to include larvaecides, arachnicides, and insect repellents or insectifuges, and is to be construed in accordance with the Insecticide Act of 1910, section 6.

We have found that alkyl 2-naphthyl ethers in which the alkyl radical contains at least four carbon atoms are effective insecticides. Examples of the alkyl radicals in such ethers are n-butyl, isobutyl, sec-butyl, n-amyl, isoamyl, 2-methyl-butyl, sec-amyl, hexyl, heptyl, octyl, dodecyl. The preparation of these materials is well known in the literature. For ease in preparation, the primary alkyl-2-naphthyl ethers are preferred. The melting points of the alkyl 2-naphthyl ethers in which the alkyl radical contains four or more carbon atoms are below 35° C. as compared with melting points about 35° C. for the alkyl 2-naphthyl ethers in which the alkyl radical contains less than four carbon atoms. The butyl 2-naphthyl ethers have melting points between 30° C. and 35° C. and are semi-solid at room temperature as prepared commercially. The amyl-2-naphthyl ethers and the higher alkyl 2-naphthyl ethers have melting points below 30° C. and are liquid at room temperature as prepared commercially. This is of particular advantage where the chemicals are to be applied in the form of aqueous dispersions due to the ease with which aqueous emulsions of water-insoluble liquids may be prepared. Further, liquid alkyl 2-naphthyl ethers facilitate the preparation of insecticides where such an alkyl 2-naphthyl ether is to be used in the form of an aqueous dispersion in admixture with a water-insoluble solid material, such as a fungicide or another insecticide, if the water-insoluble solid material is soluble in the liquid alkyl 2-naphthyl ether. In such case, the water-insoluble solid material may first be dissolved in the liquid alkyl 2-naphthyl ether and the mixture may then be readily dispersed in water as with the aid of a dispersing agent. The present preferred embodiments of the invention are the primary amyl 2-naphthyl ethers, viz. n-amyl 2-naphthyl ether, isoamyl 2-naphthyl ether, and 2-methylbutyl 2-naphthyl ether.

The alkyl 2-naphthyl ethers in which the alkyl radical contains at least four carbon atoms, may be applied to loci to be protected against insects in undiluted form, or as dusts when admixed with or absorbed on powdered solid inert carriers, such as clay or talc, or as liquids or sprays when in a liquid carrier, as in solution in a suitable solvent, or dispersed in a suitable non-solvent medium, for example, water. In protecting plants (the term including plant parts) which are subject to attack by insects, the alkyl 2-naphthyl ethers of the present invention are preferably applied as aqueous emulsions containing a dispersing agent. The alkyl 2-naphthyl ethers may be used admixed with carriers that are active of themselves, for example, other insecticides, fungicides or bactericides.

The following examples described tests on various alkyl 2-naphthyl ethers in which the alkyl radical contains at least four carbon atoms are given to illustrate the invention:

Example I

Pinto bean leaves were sprayed with one percent aqueous emulsions of various naphthyl ethers, the emulsions containing 0.1% of "Emulfor EL," a commercial surface-active dispersing agent which is a polyethylene glycol condensate, believed to be the reaction product of ethylene oxide and castor oil. The bean leaves were infested with forty Mexican bean beetles and were placed in separate covered petri dishes. After 48 hours observations disclosed mortalities of the beetles on the leaves treated with the various naphthyl ethers as shown in the following table. In untreated leaves there was no mortality of the beetles.

| Chemical: | Per cent mortality |
|---|---|
| n-Butyl 2-naphthyl ether | 100.0 |
| Isobutyl 2-naphthyl ether | 100.0 |
| n-Amyl 2-naphthyl ether | 100.0 |
| Isoamyl 2-naphthyl ether | 100.0 |
| 2-methylbutyl 2-naphthyl ether | 100.0 |
| n-Octyl 2-naphthyl ether | 85.0 |

Example II

Leaves of the broad bean (*Vicia faba*) infested with pea aphids were sprayed with one percent aqueous emulsions of various naphthyl ethers, the emulsions containing 0.1% of "Emulfor EL." Observations were made after 24 hours to disclose the kill of aphids. The percent mortality and the number of pea aphids on the leaves treated with the various naphthyl ethers is shown in the following table. In untreated (check) leaves infested with 165 aphids, the mortality was 1.8%.

| Chemical | Number of Aphids | Percent Mortality |
|---|---|---|
| n-Butyl 2-naphthyl ether | 178 | 91.6 |
| Isobutyl 2-naphthyl ether | 163 | 95.7 |
| n-Amyl 2-naphthyl ether | 142 | 94.4 |
| Isoamyl 2-naphthyl ether | 143 | 99.3 |
| 2-Methylbutyl 2-naphthyl ether | 143 | 97.9 |
| n-Octyl 2-naphthyl ether | 129 | 85.3 |

*Example III*

Pinto bean leaves infested with red spider mites were sprayed with one percent emulsions of various naphthyl ethers, the emulsions containing 0.1% of "Emulfor EL." Observations were made after 24 hours to disclose the kill of mites. The percent mortality and the number of mites on the leaves treated with the various naphthyl ethers is shown in the table below. In untreated (check) leaves infested with 143 red spider mites, the mortality was 2.1% after 24 hours.

| Chemical | No. of Mites | Percent Mortality |
|---|---|---|
| n-Butyl 2-naphthyl ether | 84 | 100.0 |
| Isobutyl 2-naphthyl ether | 136 | 100.0 |
| n-Amyl 2-naphthyl ether | 165 | 84.2 |
| Isoamyl 2-naphthyl ether | 192 | 100.0 |
| 2-Methylbutyl 2-naphthyl ether | 281 | 100.0 |
| n-Octyl 2-naphthyl ether | 186 | 92.4 |

This application is a continuation-in-part of application Serial No. 600,409, filed June 19, 1945, now abandoned.

Having thus described our invention, what we claim and desire to protect by Letters Patent is:

1. An insecticidal composition comprising an alkyl 2-naphthyl ether in which the alkyl radical contains four to eight carbon atoms, and a surface-active dispersing agent.

2. An insecticidal composition comprising an aqueous emulsion of an alkyl 2-naphthyl ether in which the alkyl radical contains four to eight carbon atoms, said aqueous emulsion containing a dispersing agent.

3. An insecticidal composition comprising a primary amyl 2-naphthyl ether, and a surface-active dispersing agent.

4. An insecticidal composition comprising an aqueous emulsion of a primary amyl 2-naphthyl ether, said aqueous emulsion containing a dispersing agent.

5. An insecticidal composition comprising isoamyl 2-naphthyl ether as an active ingredient, and a surface-active dispersing agent.

6. An insecticidal composition comprising an aqueous emulsion of isoamyl 2-naphthyl ether, said aqueous emulsion containing a dispersing agent.

THEODORE W. KERR, Jr.
WALTER D. HARRIS.

REFERENCES CITED

The following references are of record in the file of this patent:

UNITED STATES PATENTS

| Number | Name | Date |
|---|---|---|
| 2,159,025 | Hester | May 23, 1939 |

OTHER REFERENCES

Dictionary of Organic Compounds by Heilbron, 1938 edition, vol. 3, page 18. (Copy in Pat. Off. Library.)